United States Patent
Martin

Patent Number: 5,168,650
Date of Patent: Dec. 8, 1992

[54] RECOIL CORD FOR FLOATING DUCK DECOY

[76] Inventor: Wayne F. Martin, 6985 Castle La., Eden Prairie, Minn. 55346

[21] Appl. No.: 712,489

[22] Filed: Jun. 10, 1991

[51] Int. Cl.$^5$ ............................................. A01M 31/06
[52] U.S. Cl. ................................................ 43/3; 43/2
[58] Field of Search .................................. 43/1, 2, 3, 4

[56] References Cited

U.S. PATENT DOCUMENTS

| | | | |
|---|---|---|---|
| 2,278,594 | 4/1942 | Smith | 43/3 |
| 2,520,233 | 8/1950 | Buehl | 43/3 |
| 2,711,607 | 6/1955 | Watson | 43/3 |
| 2,942,370 | 6/1960 | Zaruba | 43/3 |
| 4,056,890 | 11/1977 | Dembski | 43/3 |

OTHER PUBLICATIONS

Tangle Free Line Brochure and Tangle Free Anchor Instructional Sheet.

Primary Examiner—Kurt C. Rowan
Assistant Examiner—Chuck Y. Mah
Attorney, Agent, or Firm—James W. Miller

[57] ABSTRACT

A floating decoy has a buoyant body and an anchor weight connected to the body by a cord. When deployed, the anchor weight holds the decoy in place on a body of water. A collapsible coiled cord is used to hold the anchor weight to the body. The cord has a normal, untensioned orientation providing a minimum cord length which is sufficiently short such that the cord does not have to be wound around the decoy body, or any portion thereof, when the weight is taken up.

8 Claims, 1 Drawing Sheet

U.S. Patent | Dec. 8, 1992 | 5,168,650
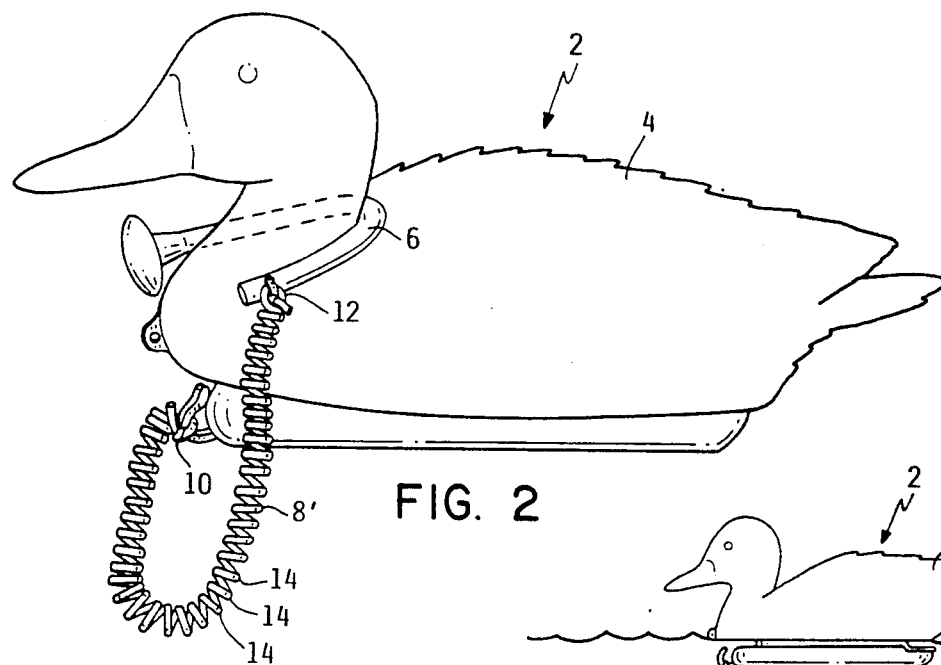
FIG. 2
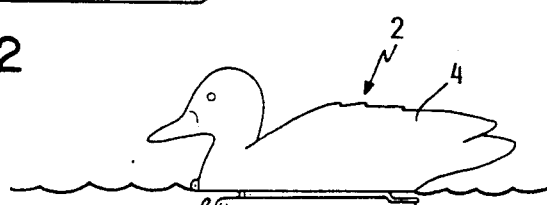
FIG. 3
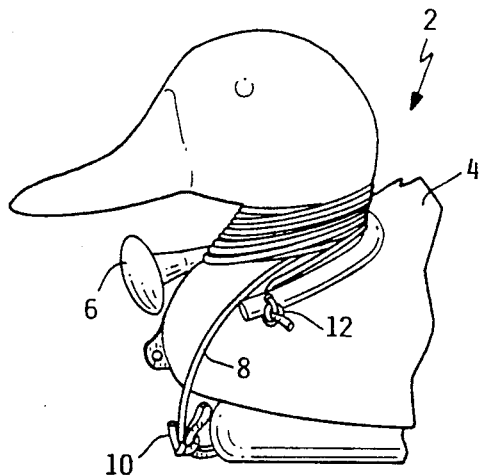
FIG. 1
(PRIOR ART)
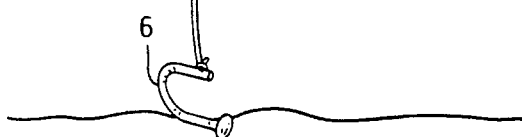

RECOIL CORD FOR FLOATING DUCK DECOY

TECHNICAL FIELD

The present invention relates generally to hunting decoys and, more specifically, to decoys which resemble waterfowl, such as ducks, suited to float on water. More particularly, the present invention relates to floating decoys held in place by an anchor weight and to the cord used to connect the anchor weight to the decoy body.

BACKGROUND OF THE INVENTION

Hunters often use decoys to attract their prey. For example, various decoys are well known which simulate the shape and coloration of a duck or some other waterfowl. While some of these decoys are designed for use on land, others are meant to float on a body of water. Such floating decoys are used on a pond or lake to which ducks are naturally attracted and are positioned near the hunter's location on such pond or lake.

Referring to FIG. 1 herein, a prior art floating decoy is illustrated. This decoy comprises a duck shaped body made of a buoyant material, or having some type of added buoyancy means, to allow the body to float on water. A U-shaped anchor weight is connected to the body by an elongated cord of predetermined length depending on the depth of the water at the hunter's usual locale. The decoy is deployed with the weigh being thrown down into the water with the cord extending until the weight touches bottom. This anchors the decoy in place and gives the decoy a natural looking floating motion to the extent allowed by the amount of slack in the cord.

When the hunting is over, it is necessary to take up and store the decoy. This is often done at the end of the day when the hunter is most tired, often cold, and sometimes wet. Often, the hunter is also wearing gloves of some type. With those decoys previously known in the prior art, most hunters wind the anchor cord around the neck of the decoy until the cord is fully wound thereon. The weight can then be slipped around over the neck of the duck and retained thereon because of its U-shape, all as shown in FIG. 1.

Needless to say, it is inconvenient to have to wind the anchor cord around the neck of the decoy at the end of the hunter's day. Quite a number of turns are required due to the length of the cord and the small diameter of the neck. In addition, many hunters use more than one decoy, and the winding of the anchor cord has to be done for each. Thus, the hunter has to spend some time winding up all the decoy cords for proper decoy storage. Again, this task has to be done when most hunters are tired and would simply prefer to be done for the day.

Some hunters try to ease the winding task by winding the cord around the decoy's body in a criss-cross or figure eight fashion. While this decreases the number of turns that are required, it is still inconvenient to do, especially when there are a number of decoys. In addition, the cords can slip off the body and possibly become tangled. This is a problem as the tangles have to be removed before the decoy can be used the next time.

SUMMARY OF THE INVENTION

The present invention relates to a floating decoy of the type described above in which a collapsible cord is used to connect the anchor weight to the decoy body.

BRIEF DESCRIPTION OF THE DRAWINGS

The present invention will be described hereafter in the Detailed Description, taken in conjunction with the following drawings, in which like reference numerals refer to like elements or parts throughout.

FIG. 1 is a partial side elevational view of a prior art floating duck decoy showing the head and neck portion thereof and particularly illustrating the type of cord previously used to connect the anchor weight to the decoy body, the cord being shown in its usual wound position located around the decoy's neck when the decoy is not in use;

FIG. 2 is a side elevational view of a floating duck decoy according to the present invention, particularly illustrating the improvement hereof comprising the use of a collapsible cord to connect the anchor weight to the decoy body, the cord being shown in its normal collapsed orientation when the decoy is not in use to provide a view analogous to that of FIG. 1; and FIG. 3 is a view of the duck decoy of FIG. 2 in use on a body of water, with the cord shown as having been extended out of its collapsed storage position to one possible elongated use position.

DETAILED DESCRIPTION

Referring first to FIG. 1, a prior art floating decoy of the type previously described in the Background of the Invention section of this patent application is illustrated as 2. Decoy 2 includes a buoyant body 4 formed in the shape of the animal which the hunter wishes to attract. In this case, body 4 has the shape of a waterfowl, specifically a duck. However, the shape of body 4 could obviously be changed to simulate other animals, e.g. geese, as the precise shape of body 4 or the type of animal being simulated is not important to the present invention as long as the decoy is a floating type decoy.

As previously described, an anchor weight 6 is connected by an anchor cord 8 to decoy body 4 to hold decoy 2 in place when the decoy is deployed on a body of water. In this regard, a hook or grommet 10 is usually provided on the front of the decoy body 4, and a hook or grommet 12 is provided on weight 6, to allow the ends of cord 8 to be tied to each respectively. Anchor weight 6 is normally U or C-shaped and is sized so that it can be stored around the decoy's neck, i.e. the weight can be slipped around the decoy's neck as shown in FIG. 1. While this is the usual type of weight used with decoy 2, other weight shapes could obviously be substituted therefor. The only purpose of weight 6 is to anchor decoy body 4 in place.

The anchor cord 8 of the prior art decoy 2 is an ordinary fabric or nylon cord of relatively small diameter. Cord 8 has to be wound around decoy 2, usually around its neck, when decoy 2 is not in use. The nature and disadvantages of this operation have been described more fully in the Background of the Invention section of this application.

The present invention comprises quite simply the use of a different, and improved, type of cord for connecting the anchor weight 6 to the decoy body 4. Specifically, the present invention comprises the use of a collapsible or recoil type cord, referred to in FIGS. 2 and 3 as 8', for connecting weight 6 to body 4. The only difference between the present invention and the prior art decoy 2 of FIG. 1 is the replacement of cord 8 with collapsible cord 8'. Thus, the same reference numerals are used in FIGS. 2 and 3 to refer to components which are identical to those shown in FIG. 1, i.e. body 4, weight 6, etc.

Collapsible cord 8' has a normal, untensioned orientation in which cord 8' has a number of coils 14 that are tightly compressed relative to one another to reduce the cord's overall length. Obviously, such a cord can be stretched out of this untensioned orientation by applying tension to the ends of cord 8' as when the anchor weight is dropped and pulls downwardly on cord 8'.

The tension provided by the dropped anchor weight 6 will stretch or elongate cord 8' to an extent allowed by the depth of the water in which the decoy is deployed. For example, if the water is not as deep as the overall maximum cord length, then cord 8' would only be partially elongated out of its normal, coiled orientation. In this water depth, the coils of cord 8' would be stretched apart, but would still be present to some degree. FIG. 3 illustrates the decoy deployed in water sufficiently deep so that cord 8'has been stretched to its maximum length. In this depth, the coils 14 of cord 8' are temporarily completely stretched out, but cord 8' will collapse and recoil when the tension of weight 6 is removed.

Any collapsible cord 8' would work for the purposes of the present invention. However, one type of cord which Applicant has found to work particularly well is that made from the material used to form certain shoelaces which are currently being sold today under the name "Spring Laces", which material was previously sold under the name "Curly Cord". These laces are manufactured and sold by the William Jette Co. of Providence, R.I. These shoelaces are most often used in connection with children's shoes. No claim is being made that Applicant has himself invented these shoelaces or the material from which they are made, but he has realized that this material makes a particularly good collapsible cord 8' for the purposes contemplated by his invention.

Applicant has found that a "Spring Lace" type cord 8'of approximately 60 inches total length will in its collapsed shape, i.e. in its normal, untensioned orientation, have a length of only 8 inches. This is short enough to allow the anchor weight 6 to be slipped around the decoy's neck without having to wind cord 8' around the decoy's neck or body at all, yet is long enough to act as an anchor cord in the shallow water depths in which these kinds of decoys are used. Obviously, the total length of cord 8' can be increased or decreased as required which will also cause the collapsed length of cord 8' to increase or decrease corresponding. Preferably, however, cord 8' has a collapsed length which is short enough to allow weight storage without any or a minimum of cord winding, giving due regard to the location on decoy body 4 to which the cord is connected and the weight storage position.

The major advantage of this invention is the ease of storage which collapsible cord 8' provides. At the end of the day when the decoys are to be taken up, the hunter simply pulls up on cord 8' to lift anchor weight 6 off the bottom. When weight 6 comes up, the hunter simply grabs it and slips it around the decoy's neck. Cord 8' naturally contracts to its untensioned orientation as shown in FIG. 2 as weight 6 is stored on the decoy. In other words, cord 8' naturally and simply contracts back to its normal, untensioned orientation once the elongating influence of the anchor weight is removed.

Thus, with the decoy of the present invention, the hunter has to do nothing about winding or getting cord 8' out of the way as he stores the weight. Cord 8' does this itself and contracts to its neat, collapsed orientation. As shown in FIG. 2 and described above, this orientation is short enough that no winding of cord 8' is required.

The time advantages and ease of use of the decoy of this invention are apparent especially since the hunter often has to take up and store more than one decoy in most cases. The hunter does not have to fumble using stiff or gloved fingers to try to wind a cord a number of times around the decoy's neck. All he has to do is pull up the cords and store the weights with no cord winding required on any decoy. In addition, cord 8' is neatly stored and ready for use the next time without any danger of tangling. This avoids a major source of frustration most hunters experience in using floating decoys of this type.

Various modifications of this invention will be apparent to those skilled in the art. While one particular preferred collapsible cord has been described herein, other types of collapsible cords could be used in its place. Thus, the scope of the present invention is to be limited only by the appended claims.

I claim:

1. An improved floating type decoy, which comprises:
   (a) a buoyant body in the shape of a waterfowl which body is capable of floating on water, the body having means for connecting one end of an anchor cord thereto, wherein the decoy body is provided with a neck;
   (b) an anchor weight for anchoring the body to the bottom of a body of water on which the decoy is deployed, the anchor weight having means for connecting the other end of the anchor cord thereto, wherein the anchor weight is shaped to slide around the neck of the decoy to be retained thereon in the storage position; and
   (c) an anchor cord extending between and connecting the anchor weight to the body, the anchor cord being made of a collapsible material and having a normally coiled orientation in which the coils are relatively collapsed to compress the cord into a cord of minimum length when no tension is applied to the cord such that the cord in a storage position of the anchor weight on the body will naturally collapse on its own into its coiled orientation without having to be wound or otherwise urged into such coiled orientation, wherein the anchor cord is sufficiently flexible to allow the ends of the cord to be tied to the cord connecting means on the body and the anchor weight, and wherein the minimum length of the cord in its coiled orientation is sufficiently short to allow the weight to be slid onto the neck of the decoy without having to wind the cord around the neck or body of the decoy to reduce its length.

2. The method of claim 1, wherein the cord connecting means for the one end of the anchor cord is located on an exterior surface of the decoy body.

3. The decoy of claim 2, wherein the anchor cord is made from the material used to make Spring Laces.

4. The decoy of claim 3, wherein the decoy body is provided with a neck and the anchor weight is shaped to slide around the neck of the decoy to be retained thereon in the storage position, and wherein the minimum length of the cord in its coiled orientation is sufficiently short to allow the weight to be slid onto the neck of the decoy without having to wind the cord around the neck or body of the decoy to reduce its length.

5. The decoy of claim 1, wherein the anchor cord is made from the material used to make Spring Laces.

6. A method for deploying and storing a floating decoy, which comprises:
 (a) providing a buoyant decoy body having a neck which will float on water, the body having means for connecting one end of an anchor cord thereto;
 (b) providing an anchor weight shaped to slide around said neck of the decoy and be retained thereon in a storage position, the anchor weight being suited for having the other end of the anchor cord connected thereto; and
 (c) connecting the anchor weight to the decoy body using a cord made from a material which causes the cord to collapse when untensioned into a minimum length which is sufficiently short to allow the weight to be slid onto the neck of the decoy without having to wind the cord around the neck or body of the decoy to reduce its length.

7. The method of claim 6, wherein the cord in its untensioned orientation has a coiled shape.

8. The method of claim 6, wherein the cord is made from the material used to make Spring Laces.

* * * * *